United States Patent
Chen et al.

(10) Patent No.: US 10,713,250 B2
(45) Date of Patent: Jul. 14, 2020

(54) DISTRIBUTED DATABASE JOB DATA SKEW DETECTION

(71) Applicants: eBay Inc., San Jose, CA (US); Tan Chen, Shanghai (CN)

(72) Inventors: Tan Chen, Shanghai (CN); Hao Chen, Shanghai (CN); Yong Zhang, San Jose, CA (US); Libin Sun, Shanghai (CN); Xin Li, Shanghai (CN)

(73) Assignee: eBay Inc., San Jose, CA (US)

( * ) Notice: Subject to any disclaimer, the term of this patent is extended or adjusted under 35 U.S.C. 154(b) by 267 days.

(21) Appl. No.: 15/775,713

(22) PCT Filed: Nov. 13, 2015

(86) PCT No.: PCT/CN2015/094588
§ 371 (c)(1),
(2) Date: May 11, 2018

(87) PCT Pub. No.: WO2017/079978
PCT Pub. Date: May 18, 2017

(65) Prior Publication Data
US 2018/0349441 A1    Dec. 6, 2018

(51) Int. Cl.
*G06F 16/2453* (2019.01)
*G06F 16/27* (2019.01)
*G06F 16/33* (2019.01)

(52) U.S. Cl.
CPC ........ *G06F 16/24542* (2019.01); *G06F 16/27* (2019.01); *G06F 16/3346* (2019.01)

(58) Field of Classification Search
CPC .. G06F 16/217; G06F 16/24542; G06F 16/27; G06F 16/3346
See application file for complete search history.

(56) References Cited

U.S. PATENT DOCUMENTS 5,301,317 A * 4/1994 Lohman ............ G06F 16/24547
707/999.002
6,615,201 B1   9/2003 Seshadri et al.
(Continued)

FOREIGN PATENT DOCUMENTS

| JP | 2015-49891 A | 3/2015 |
| KR | 10-0992008 B1 | 11/2010 |
| WO | 2017/079978 A1 | 5/2017 |

OTHER PUBLICATIONS

Yin, Jinsong & Qiao, Yuanyuan, "Performance Modeling and Optimization of Mapreduce Programs", Proceedings of IEEE CCIS2014, pp. 180-186. (Year: 2014).*

(Continued)

*Primary Examiner* — Scott A. Waldron
(74) *Attorney, Agent, or Firm* — Shook, Hardy & Bacon

(57) ABSTRACT

A system and method for identifying whether data skew is causing delays in a map phase and/or a reduce phase of a query of a distributed database. The system and method identify the values of various metrics relating to a database query. These metrics include map phase and reduce phase durations and various related metrics. The system and method gather statistics of multiple queries to determine correlation levels between the metrics and the map phase and reduce phase durations. Based on the statistics, the system and method determine whether one or both of the map and reduce phases for a query/response are taking longer than expected. If the durations are longer than expected, the system identifies the delay as caused by data skew and informs the originator of the query.

20 Claims, 6 Drawing Sheets

(56) References Cited

U.S. PATENT DOCUMENTS

| | | |
|---|---|---|
| 8,762,367 B2 | 6/2014 | Burger et al. |
| 8,799,916 B2 * | 8/2014 | Cherkasova .......... G06F 9/5066 718/100 |
| 2003/0172046 A1 | 9/2003 | Scott |
| 2004/0093254 A1 | 5/2004 | Hirata et al. |

OTHER PUBLICATIONS

Office Action received for Korean Patent Application No. 10-2018-7016649, dated Jun. 17, 2019, 13 pages (7 pages of Official copy and 6 pages of English Translation).)

Response to European Search Report Filed on Aug. 21, 2019 for European Patent Application No. 15908108.2, dated Mar. 7, 2019, 16 pages.

International Preliminary Report on Patentability received for PCT Application No. PCT/CN2015/094588, dated May 24, 2018, 5 pages.

International Search Report received for PCT Application No. PCT/CN2015/094588, dated Aug. 2, 2016, 3 pages.

Written Opinion received for PCT Application No. PCT/CN2015/094588, dated Aug. 2, 2016, 3 pages.

Extended European Search Report Received for European Patent Application No. 15908108.2, dated Mar. 7, 2019, 10 pages.

Herodotou, "Hadoop Performance Models", Retrieved from the Internet: URL:http://www2.cs.duke.edu/starfish/files/hadoop-models.pdf, Jun. 30, 2011, pp. 1-19.

Herodotou et al., "Profiling, What-if Analysis, and Costbased Optimization of MapReduce Programs", Proceedings of the VLDB Endowment, vol. 4, No. 11, Aug. 29, 2011, pp. 1111-1122.

* cited by examiner

DISTRIBUTED DATABASE JOB DATA SKEW DETECTION

CROSS-REFERENCE TO RELATED APPLICATIONS

This application entitled "Distributed Database Job Data Skew Detection," is a National Phase U.S. Nonprovisional Application claiming priority to PCT Application No. PCT/CN2015/094588, entitled "Distributed Database Job Data Skew Detection," filed on Nov. 13, 2015. The entirety of the aforementioned application is incorporated by reference herein.

TECHNICAL FIELD

Embodiments of the present disclosure relate generally to data processing and, more particularly, but not by way of limitation, to determination of delay sources during database queries.

BACKGROUND

Databases that are distributed across many computers, including some SQL databases, Hadoop databases (e.g., eBay's® Hadoop® database), etc. receive queries and for some such databases perform these queries in parallel on different parts of a data set that are distributed on different servers, then return a response to the originator of the query and/or one or more other designated locations. Responses to queries are generally returned fastest when the data being queried is evenly distributed among multiple servers. All other things being equal, some distributed databases take longer to respond to queries when the data set(s) being queried are concentrated entirely or mostly on a small number of servers (or one server). Thus long delays can be caused by such concentrations of data (sometimes called "data skew"). However, all other things are not always equal. There may be various other causes for a response to a query to be long delayed, such as resource congestion. That is, the distributed database may receive large numbers of queries at the same time. In such a case, even a query on well distributed data will take a long time.

This occurs because various queries are designed and sent to the database servers by various users and groups of users. There is generally little to no coordination among users to ensure that the system receives a steady supply of queries, rather than receiving many queries during some periods (e.g., weekdays from 9 AM-5 PM) and few queries at other times (e.g., weekends at 2 AM).

Although some database systems redistribute data based on the queries that come in, in some cases this is not necessary, even when data for a particular query is highly skewed. For example, some queries may so simple and/or be performed on so little data that even when a high percentage of that data is concentrated on one server, the response would come in an acceptable amount of time, unless the database (or the specific server on which the data for that query is concentrated) is congested. That is, even in a case where there is a high data skew and a long delay, the high data skew may not be at fault for the long delay.

The performance of a query by the database servers and the return of the response may be referred to herein as a "job" and the delay between submitting the query and receiving the response may be referred to as a "job delay". Currently, it is very difficult to know if a job delay is caused by a data skew issue or a congestion issue. This is a problem for users of distributed databases, because data skew issue will cause their jobs run extremely slowly which may not only affect the business contracts for the use of the database, but also impact the performance of the entire database due to resource contention. Accordingly, there is a need for a user friendly tool to determine the cause of long job delays.

BRIEF DESCRIPTION OF THE DRAWINGS

Various ones of the appended drawings merely illustrate example embodiments of the present disclosure and cannot be considered as limiting its scope.

Figure 1:
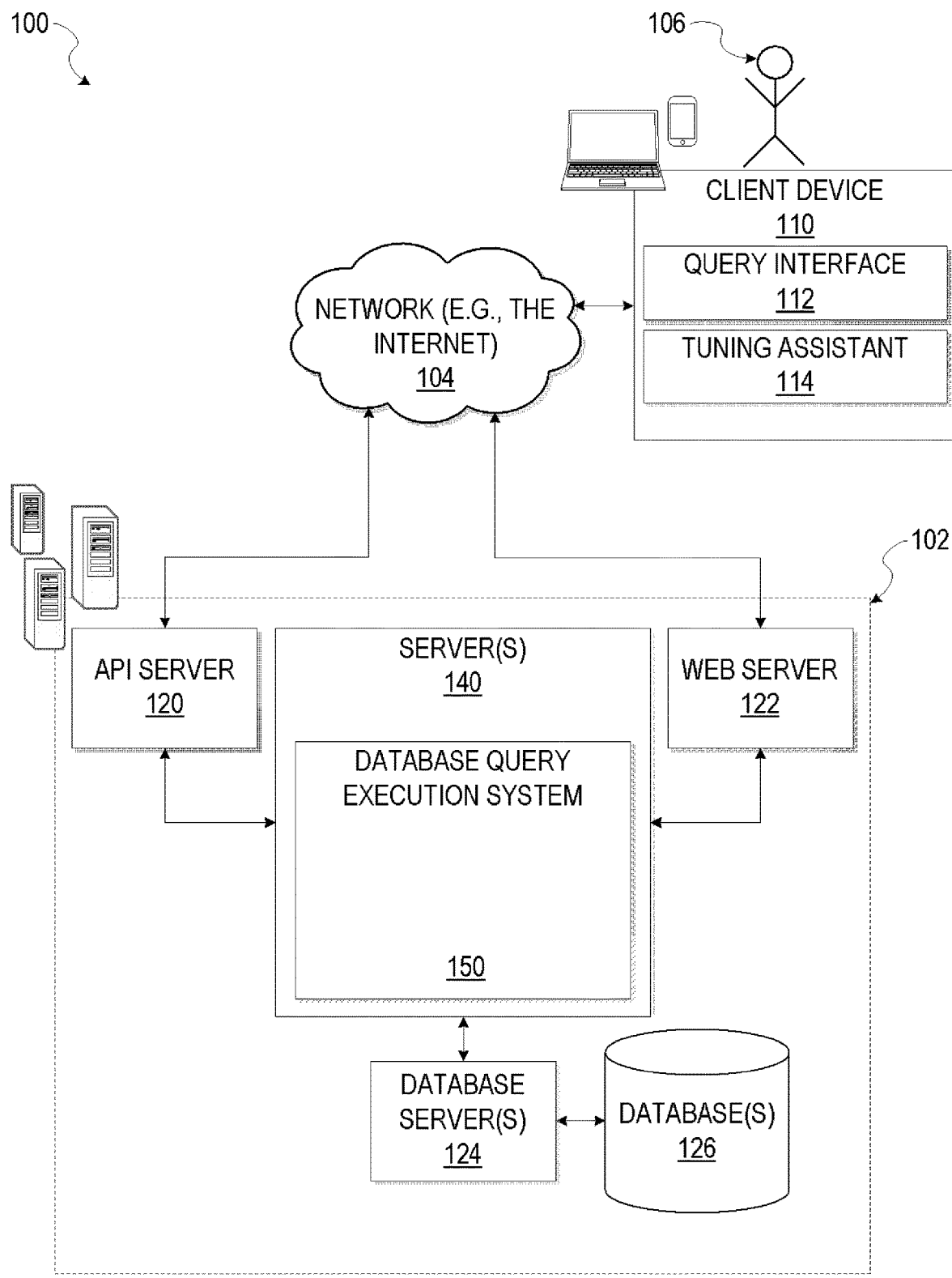
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Some embodiments provide a delay identification system and method for improving the efficiency of database searches by informing a user of the cause(s) of delays during a query and response of a distributed database ("job delay"). The delay cause(s) are determined based on analyzing multiple statistical features of each of multiple metrics that relate to one or more jobs. The measured metrics of some embodiments include measurements relating to a map phase of a job, a shuffle phase of the job, and a reduction phase of the job.

The map phase filters and sorts the data being queried into multiple queues. For example, a map phase might sort sales orders (to various companies) by company name one queue for each name, each queue containing the orders by the corresponding company.

The shuffle phase (sometimes called a "shuffle and sort" phase) prepares the data from the mapper phase and moves the data to the nodes where the reducer phase operations will be performed. When the map phase is complete, the data identified by the map phase are sorted by a key value divided among the multiple database servers and then written to the assigned database servers. In the above example, the data in each queue may be sorted by order number, then the data for each queue (here, each company name) and each queue sent to its own server for the reduce phase. In some cases, this is an opportunity for data skew to occur, as a query that blindly divides by company may create data skew in cases where a small number of companies generate most of the sales orders.

The reduce phase summarizes the job. To continue the above example, the reduce phase may count the number of orders in each queue, identifying how many orders each company made.

The system of some embodiments measures some or all of the following metrics, sometimes called "counters", (further explained below): 1) a map phase duration; 2) a reduce phase duration; 3) a count of records read in the map phase; 4) a count of records read in the reduce phase; 5) a count of records read by the combiner; 6) a count of "spilled" map records; 7) a count of shuffle records read by the reducer, 8) a count of the number of bytes read to the local file system in the map phase; 9) a count of the number of bytes read to the local file system in the reduce phase; 10) a count of the number of bytes read to the distributed file system (e.g., the Hadoop® Distributed File System (HDFS)) in the map phase; and 11) a count of the number of bytes read to the distributed file system (e.g., the HDFS) in the reduce phase.

The system of some embodiments determines (for each metric) some or all of the following statistics based measured metrics for multiple jobs performed over a particular time period (see below for additional detail on time period) 1) the average (e.g., mean) value of the metric, 2) the maximum value of the metric, 3) the minimum value of the metric, and 4) a particular percentile value (e.g., the value of the $50^{th}$ percentile, $95^{th}$ percentile, etc.); 5) a distribution of the values of the metrics; 6) a maximum z-score of the metrics; 7) the top-N (where N is a chosen integer) values of each metric across the jobs; and 8) a correlation between the metric and the duration of a map/reduce duration of the job.

These statistics may be gathered a selected time period relating to the time period of the job being analyzed. Some embodiments allow one or more selectable relationships between the time of the job being analyzed and the normal statistics. These relationships, in some embodiments, may include: 1) a time period starting at some time during the job for which the statistics are analyzed; 2) a time period ending with the start of the job being analyzed; 3) a time period that includes times both before and after the analyzed job; 4) a comparable time (e.g., for a job run between 9 AM and LOAM on Monday, the aggregate statistics may be for jobs run during that hour on one or more Mondays in different weeks); and 5) a time selected by a user. For example, if one hundred jobs ran on a cluster in a selected time period with map phase durations ranging smoothly from 1 second to 100 seconds (i.e., 1, 2, 3, . . . 98, 99, 100), the aggregate statistics would have: 1) an average map phase duration of 50.5 seconds; 2) a minimum map phase duration of 1 second; 3) a maximum map phase duration of 100 seconds; and 4) a $95^{th}$ percentile of map phase durations of 95 seconds.

The distribution of the values of the metrics mentioned above is a distribution of the metric values over the jobs executed on a cluster of database servers. The correlation for a particular metric is the correlation between the particular metric and the duration of the relevant phase. For example, if increasing the number of records read in the map phase always causes a proportionate increase in the map phase duration, then the correlation between those two metrics would be 1. Similarly, if an increase in the number of bytes read to the local file system in the reduce phase causes an increase in the duration of the reduce phase, by close to, but not exactly a proportionate amount, then the correlation is less than 1, but close to 1. In some embodiments, the combiner input records metric statistics and/or the reduce shuffle records statistics are examined to determine whether the metrics are correlated with the reduce phase duration. In other embodiments, one or both of those sets of statistics are examined to determine whether the metrics are correlated with the map phase duration.

When a correlation between a metric and its corresponding duration determined to be above a set threshold level (e.g., 0.9) the system may use that determination as one of multiple criteria for determining whether job delays are caused by data skew. The system may combine this determination with a determination whether the maximum z-score (for the duration, given a particular value of that metric) for a query is greater than a threshold. One of ordinary skill in the art will understand that as the map phase duration metric is always 100% correlated with itself, the map phase duration metric is not used to identify whether data skew is causing an increase in the map phase duration. For similar reasons, the reduce phase duration metric is not used to determine whether data skew is causing an increase in the reduce phase duration.

Some queries inherently take more time than others. For example, a query that searches a million records is likely to take more time than a query that searches a thousand records. Accordingly, the system takes the value of a particular metric into account if that metric is strongly correlated with duration. The system then determines whether a particular phase of a particular query took longer than would be expected for the given value of the metric. For example, a map phase duration of one-hundred seconds for a query of one-million records may be within the expected range, but a map phase duration of one-hundred seconds for a query of one-thousand records would be far longer than expected.

The system may calculate the expected duration values based on ranges of the metric values (e.g., one average duration and standard deviation for queries of 1001-2000 records, a second average duration and standard deviation for queries of 2001-3000 records, etc.). Once these averages and standard deviations are calculated, the value of a metric in a particular query can be used to determine the statistical distributions of durations for queries with that metric value.

For a particular duration value distribution, a z-score is calculated based on the ratio of the amount that the particular value differs from the expected (average) value of the distribution, divided by the standard deviation of the distribution. For example, a value that is 2 standard deviations above the average would have a z-score of 2. Each job would have an expected value for a duration based on the value of each of the strongly correlated metrics. The z-score for the duration, with a given value of a particular metric is determined by: 1) the value of that particular metric, 2) what the average value of the corresponding duration is for the value of the particular metric, 3) how far the actual value of the corresponding duration is from the average value of the corresponding duration a) among all jobs with that value of the metric, b) on the cluster, c) in the selected time, 4) divided by the standard deviation in the duration calculated from the durations of queries with the same value of the particular metric.

The system may, for each highly correlated metric determine a maximum z-score for the corresponding durations of jobs within each of a multiple of ranges of values of the metric. When a query falls within a particular range of values of a particular metric, the z-score of the corresponding duration is compared to the maximum z-score. When the z-score is greater than a threshold fraction of the maximum z-score, the query is identified as having delays due to data skew.

While in the example above, only the correlation statistic and the maximum z-score statistic are used to identify data skew, in other embodiments, some or all of the 88 combinations of the 11 metrics with the 8 statistics (other than correlation between map/reduce duration and themselves) may be used to identify whether data skew is causing job delays.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a database query interface 112, a database tuning assistant 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a database query interface, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if an e-commerce site application is not included in the client device 110, the client device 110 may still use its a database query interface 112 to access a database (or a variant thereof) hosted on the server(s) 140.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the server(s) 140 via the network 104. In this instance, the networked system 102, in response to receiving the input from the user, communicates information to the client device 110 via the network 104 to be presented to the user. In this way, the user can interact with the server(s) 140 using the client device 110.

An application program interface (API) server 120 and a web server 122 are coupled to, and provide programmatic and web interfaces respectively to, one or more server(s) 140. The server(s) 140 may host one or more database query execution systems, each of which may comprise one or more modules or applications and each of which may be embodied as hardware, software, firmware, or any combination thereof. The server(s) 140 are, in turn, shown to be coupled to one or more database servers 124 that facilitate access to one or more information storage repositories or database(s) 126. In an example embodiment, the databases 126 are storage devices that store information to be posted (e.g., publications or listings) to a publication system and accessible to database queries provided via database query interface 112. The databases 126 may also store digital item information in accordance with example embodiments.

The database query execution system 150 may provide functionality operable to divide the operations commanded by database queries into multiple parallel operations to be performed by one or more database servers 124 using the queries supplied by users of the database interface 112. In some embodiments, the database query execution system runs on top of a database server (e.g., SQL Server, Oracle, MySQL, Hadoop or other database server). In other embodiments, the database query execution system is part of an execution engine/query plan engine of the database server. In either of such embodiments, the database query execution system 150 may access the searched for data from the databases 126, and other sources.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The database query execution system 150 could also be implemented as standalone software programs, which do not necessarily have networking capabilities.

The database query interface 112 may access the database via the web interface supported by the web server 122. The database tuning assistant 114 may receive recommendations and statistics regarding a set of one or more queries produced via an account (e.g., using database query interfaces 112 on one or more client devices.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 2:
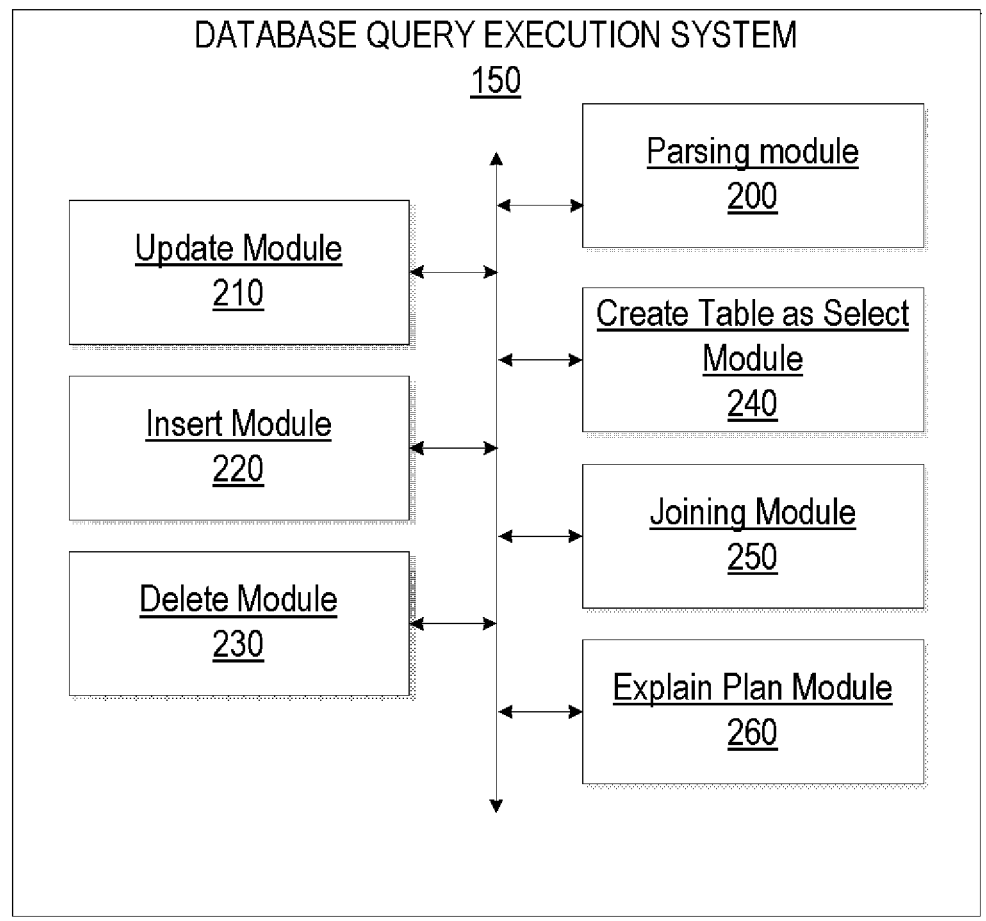
FIG. 2 is a modular diagram of a database query execution system

FIG. 2 illustrates a database query execution system 150. The system 150 includes a Parsing Module 200 to parse received database queries, an Update Module 210, an Insert Module 220, a Delete Module 230, a Create Table as Select Module 240, a Joining Module 250, and an Execution Plan Module 260. The Parsing Module 200 may determine which other modules of the database execution system 150 to activate and what parameters to send to the other modules based on a received database query. The Update Module 210 replaces a value of an existing database cell with a new value. The Insert Module 220 adds a new structure (e.g., a new column or row in a table) to the database. The Delete Module 230 removes a value from the database. The Create Table as Select Module 240 creates a table in the database by selecting data from an existing table. The Joining Module 250 combines data from more than one table. When the data types of the data being combined are not identical, one or more of the existing sets of data must be translated into a different form of data in order to join the data. The Execution Plan Module 260 determines a plan for searching the data in response to the database query. In some systems (e.g., in an Oracle database system) the Execution Plan is accessed for display to a user and/or to another module by a command such as an "Explain Plan for" command.

One of ordinary skill in the art will understand that this list of modules is not exhaustive and the system 150 may contain additional module and/or perform the operations of more than one of the listed modules with a single module. Each of the modules 210-260 commands the database servers 126 of FIG. 1 to perform the corresponding query operation.

Figure 3:
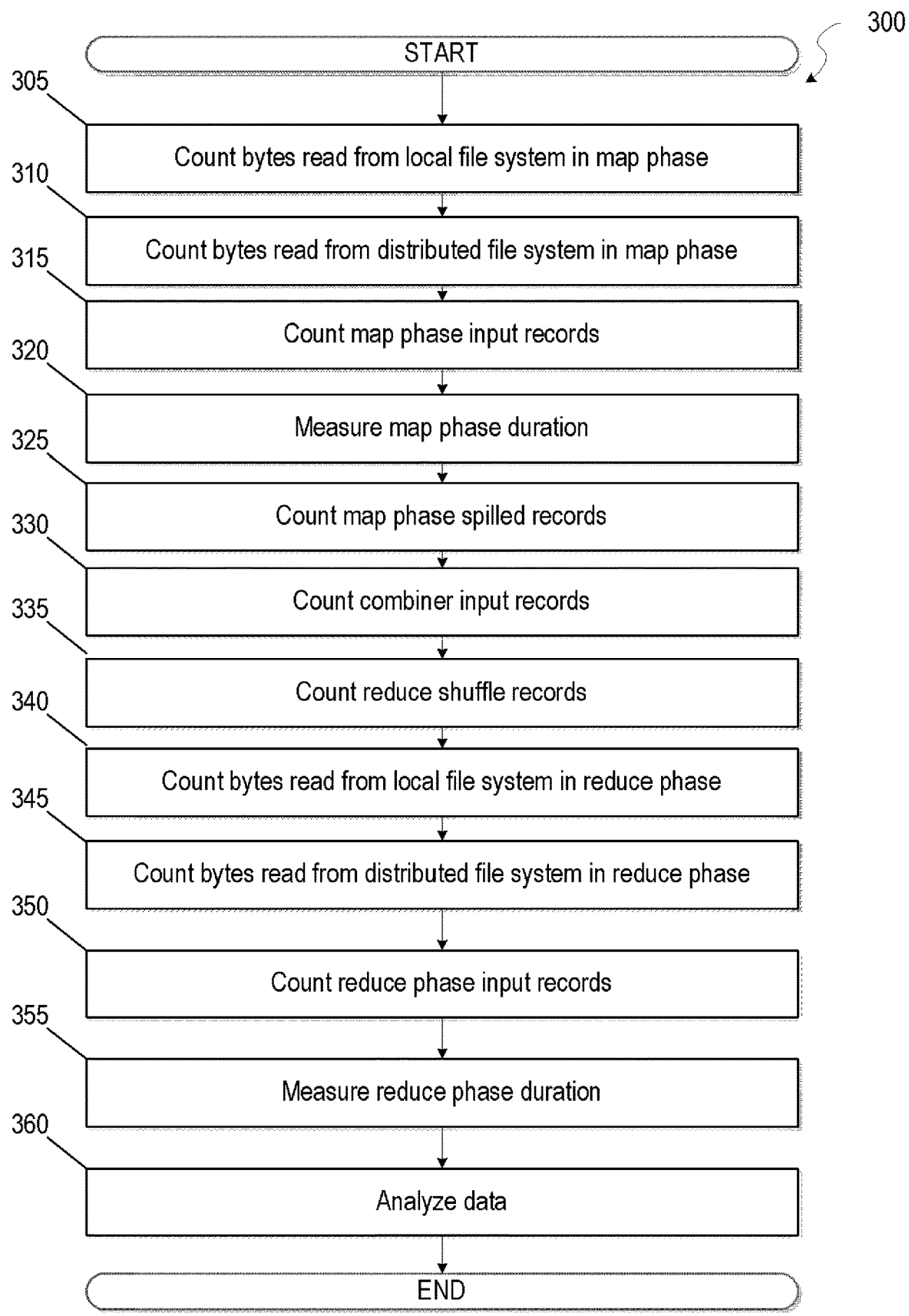
FIG. 3 conceptually illustrates a method of some embodiments for gathering the values of the metrics used in identifying causes of job delays in a distributed database.

FIG. 3 conceptually illustrates a method 300 of some embodiments for gathering the values of the metrics used in identifying causes of job delays in a distributed database. Although the description below applies to analysis done on a query by query basis, one of ordinary skill in the art will understand that the analysis may be performed on multiple runs of the same query or on multiple queries to capture the relevant statistical data. Although a particular order of collecting the data is shown, other embodiments collect the data in other orders.

The method 300 counts (at 305) bytes read from a local file system (e.g., the file system on which the query is made) in the map phase. In general, the more bytes read from the local system, the greater the duration of the map phase.

The method 300 counts (at 310) the bytes read from the distributed file system in map phase. In general, the more bytes read from the distributed file system in the map phase, the greater the duration of the map phase. However, if high data skew conditions cause a delay in the map phase of a particular query, the duration of the map phase will increase relative to the expected value and the system will identify data skew as the cause.

The method counts (at 315) the number of records input during the map phase. Again, more records input in the map phase tends to result in longer map phases, but anomalous duration increases indicate data skew.

The method measures (at 320) the map phase duration. For a particular query, this duration indicates data skew if it is longer would be predicted from the values of the map phase related metrics.

The method counts (at 325) the number of map phase spilled records. In this context, a record is considered "spilled" if it has to be written to a disk during a job (as opposed to being kept in faster memory, e.g., RAM). More records spilled in the map phase tends to result in longer map phases, since writing to and reading from a disk is generally slower than keeping the records in RAM. Again, anomalously long durations for a query indicate data skew.

The method counts (at 330) the number of combiner input records. A combiner is used between the map phase reduce phase to reduce the volume of data transfer between the map and reduce phases. Whether a large number of combiner input records increases the map phase duration or the reduce phase duration depends on how the system characterizes the combiner time.

The method counts (at 335) the number of reduce shuffle records. The shuffle phase (sometimes called a "shuffle and sort" phase) prepares the data from the mapper phase and moves the data to the nodes where the reducer phase operations will be performed. Whether a large number of shuffle records increases the map phase duration or the reduce phase duration depends on how the system characterizes the shuffle and sort time.

The method 300 counts (at 340) bytes read from a local file system (e.g., the file system on which the query is made) in the reduce phase. In general, the more bytes read from the local system, the greater the duration of the reduce phase.

The method 300 counts (at 345) the bytes read from the distributed file system in reduce phase. In general, the more bytes read from the distributed file system in the reduce phase, the greater the duration of the reduce phase. However, if high data skew conditions cause a delay in the reduce phase of a particular query, the duration of the reduce phase will increase relative to the expected value and the system will identify data skew as the cause.

The method counts (at 350) the number of records input during the reduce phase. Again, more records input in the reduce phase tends to result in longer reduce phases, but anomalous duration increases indicate data skew.

The method measures (at 355) the reduce phase duration. For a particular query, this duration indicates data skew if it is longer would be predicted from the values of the reduce phase related metrics.

The method then analyzes (at 360) the data. The system analyzes the data for a particular query to determine whether the corresponding job is delayed by data skew, and if so, whether the data skew is in the map phase, the reduce phase, or both.

Figure 4:
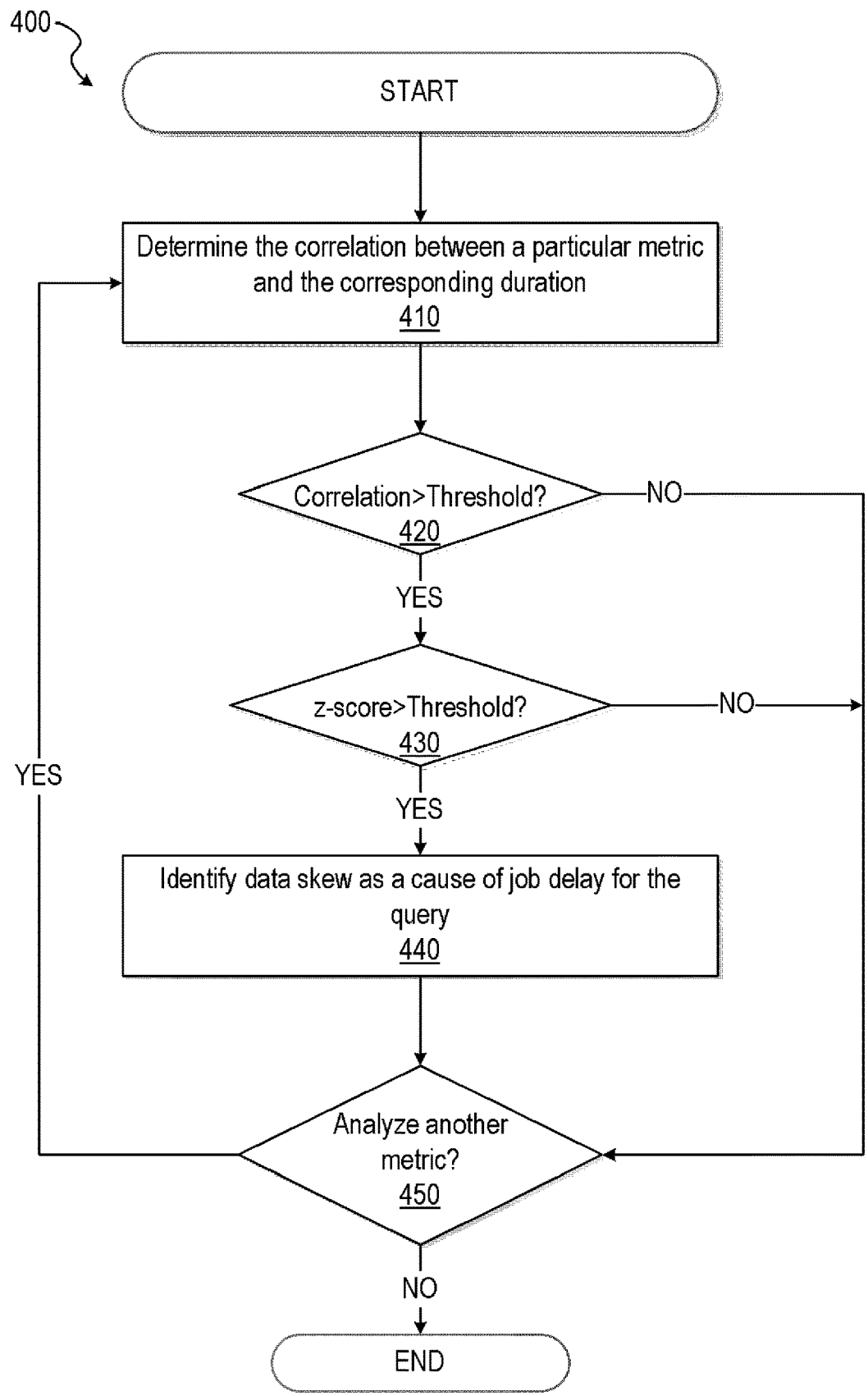
FIG. 4 conceptually illustrates a method of some embodiments for determining data skew in a particular phase of a job.

FIG. 4 conceptually illustrates a method 400 of some embodiments for determining data skew in a particular phase of a job. The method 400 determines (at 410) (based on statistical analysis of many jobs) the correlation between a particular metric and the corresponding duration of a job (e.g., for map phase related metrics, the corresponding duration is the map phase duration, for the reduce phase related metrics, the corresponding duration is the reduce phase duration). The method determines (at 420) whether this correlation is greater than a threshold value (e.g., 90%, 95%, etc.). If the correlation for a metric is not higher than the threshold value, then the method moves on to operation 450. The method determines (at 450) whether there is another metric to analyze, if so, the method returns to operation 410 to determine another correlation. If not, the method 400 ends.

If (at 420) the correlation was above the threshold, then the method determines (at 430) whether the z-score for the relevant duration is above a threshold (e.g., some fraction of the maximum z-score, such as 90% of the maximum z-score). If the z-score is above the threshold, then the method identifies data skew as a cause of the delay of the corresponding job phase of the query. If the z-score is below the threshold, then the method does not determine that that metric indicates that data skew is a cause of job delay. However, the method may find that data skew is a cause based on analysis of other metrics. The method then returns to operation 450 and cycles through each metric until all metrics have been analyzed, and then the method ends.

The modules, methods, applications and so forth described in conjunction with FIGS. 1-4 are implemented in some embodiments in the context of a set of machines and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Figure 5:
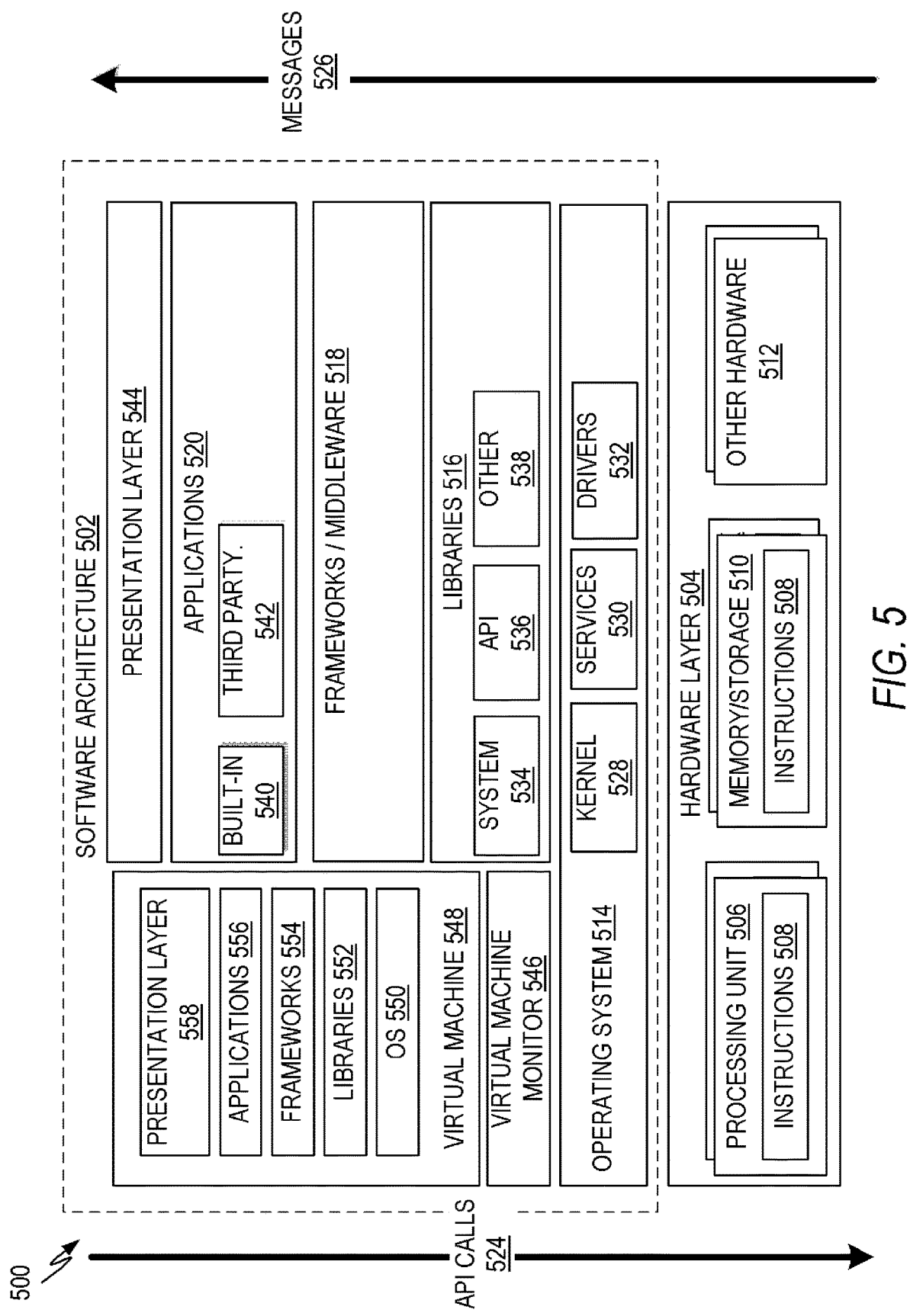
FIG. 5 is a block diagram illustrating an example of a software architecture that may be installed on a machine, according to some example embodiments.

FIG. 5 is a block diagram 500 illustrating a representative software architecture 502, which may be used in conjunction with various hardware architectures herein described. FIG. 5 is merely a non-limiting example of a software architecture and it will be appreciated that many other architectures may be implemented to facilitate the functionality described herein. The software architecture 502 may be executing on hardware such as machine 600 of FIG. 6 that includes, among other things, processors 610, memory 630, and I/O components 650. A representative hardware layer 504 is illustrated and can represent, for example, the machine 600 of FIG. 6. The representative hardware layer 504 comprises one or more processing units 506 having associated executable instructions 508. Executable instructions 508 represent the executable instructions of the software architecture 502, including implementation of the methods, modules and so forth of FIGS. 1-4. For example, the parsing module 200 may be implemented in the processing unit. Hardware layer 504 also includes memory and/or storage modules 510, which also have executable instructions 508. Hardware layer 504 may also comprise other hardware as indicated by 512 which represents any other hardware of the hardware layer 504, such as the other hardware illustrated as part of machine 600.

In the example architecture of FIG. 5, the software 502 may be conceptualized as a stack of layers where each layer provides particular functionality. For example, the software 502 may include layers such as an operating system 514, libraries 516, frameworks/middleware 518, applications 520 and presentation layer 522. Operationally, the applications 520 and/or other components within the layers may invoke application programming interface (API) calls 524 through the software stack and receive a response, returned values, and so forth illustrated as messages 526 in response to the API calls 524. The layers illustrated are representative in nature and not all software architectures have all layers. For example, some mobile or special purpose operating systems may not provide a frameworks/middleware layer 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 516 may include system 534 libraries (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be utilized by the applications 520 and/or other software components/modules. For example, the frameworks 518 may provide various graphic user interface (GUI) functions, high-level resource management, high-level location services, and so forth. The frameworks 518 may provide a broad spectrum of other APIs that may be utilized by the applications 520 and/or other software components/modules, some of which may be specific to a particular operating system or platform.

The applications 520 includes built-in applications 540 and/or third party applications 542. Examples of representative built-in applications 540 may include, but are not limited to, a contacts application, a browser application, a book reader application, a location application, a media application, a messaging application, and/or a game application. Third party applications 542 may include any of the built in applications as well as a broad assortment of other applications. In one specific example, the third party applications may include a database query interface and/or a database tuning assistant. In another specific example, the third party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 542 may invoke the API calls 524 provided by the mobile operating system such as operating system 514 to facilitate functionality described herein.

The applications 520 may utilize built in operating system functions (e.g., kernel 528, services 530 and/or drivers 532), libraries (e.g., system 534, APIs 536, and other libraries 538), frameworks/middleware 518 to create user interfaces to interact with users of the system. Alternatively, or additionally, in some systems interactions with a user may occur through a presentation layer, such as presentation layer 544. In these systems, the application/module "logic" can be separated from the aspects of the application/module that interact with a user.

Some software architectures utilize virtual machines. In the example of FIG. 5, this is illustrated by virtual machine 548. A virtual machine creates a software environment where applications/modules can execute as if they were executing on a hardware machine (such as the machine of FIG. 6, for example). A virtual machine is hosted by a host operating system (operating system 514 in FIG. 6) and typically, although not always, has a virtual machine monitor 546, which manages the operation of the virtual machine as well as the interface with the host operating system (i.e., operating system 514). A software architecture executes within the virtual machine such as an operating system 550, libraries 552, frameworks/middleware 554, applications 556 and/or presentation layer 558. These layers of software architecture executing within the virtual machine 548 can be the same as corresponding layers previously described or may be different.

Example Machine Architecture and
Machine-Readable Medium

Figure 6:
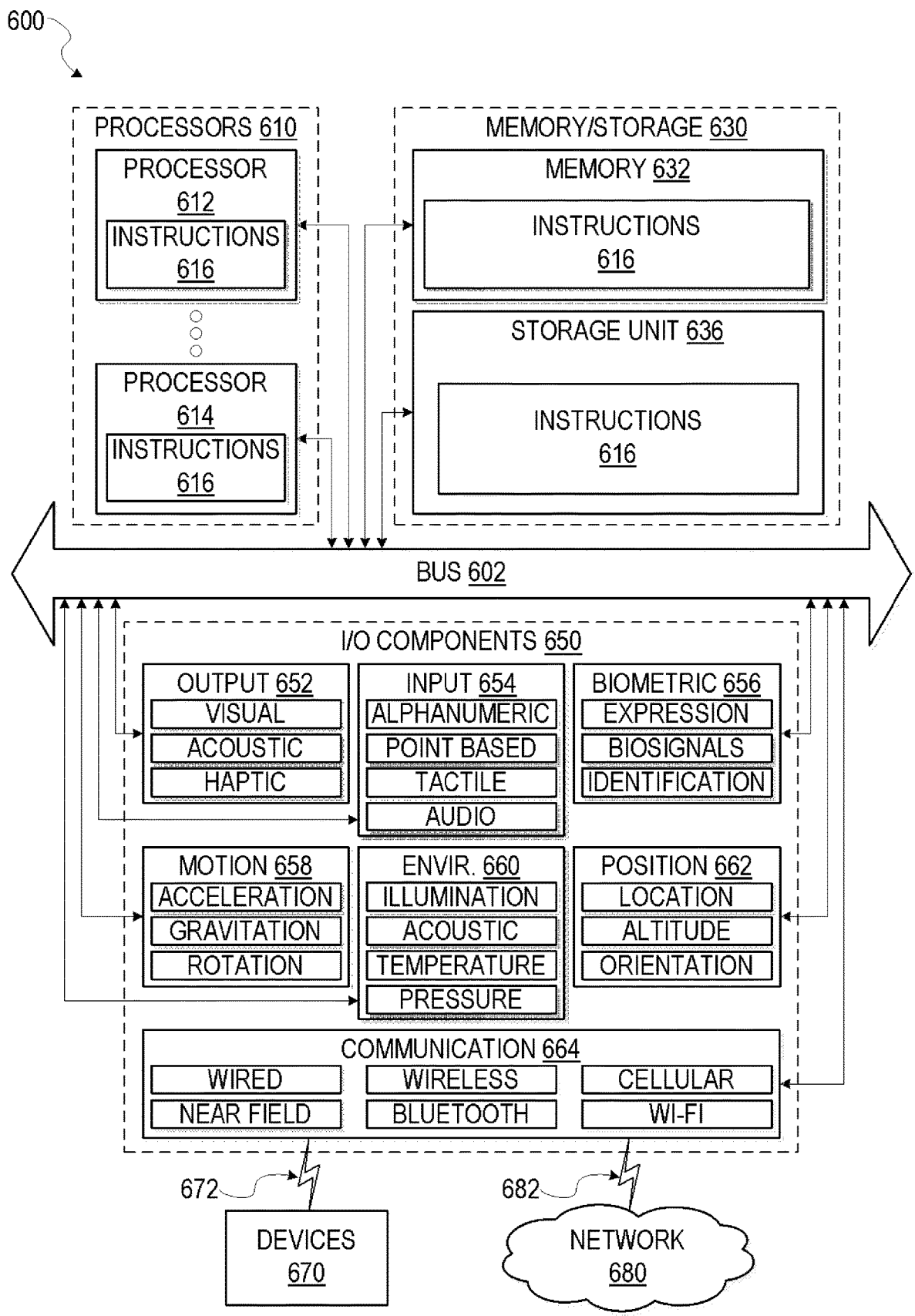
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example the instructions may cause the machine to execute the flow diagrams of FIGS. 3-4. Additionally, or alternatively, the instructions may implement the Parsing Module 200, Update Module 210, Insert Module 220, Delete Module 230, Create Table as Select Module 240, Joining Module 250, and/or Execution Plan Module 260 of FIG. 2, and so forth. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. The scoring system described with respect to FIGS. 1-4 may be implemented on one or more servers with only the display of the results being implemented on a client device. Alternately the scoring system may collect data using servers but analyze that data on a client device and display the results on the client device. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method comprising:
   for each of a selected plurality of queries to a distributed database:
      determining a duration of a phase of the query;
      determining a value of a metric correlated with the duration of the phase; and
      determining a relative difference between the duration of the phase and an average duration of the corresponding phases of each of the plurality of queries;
   based on the determined durations and the determined values, calculating a correlation level between the metric and the duration of the phase and a maximum relative difference between the average duration and the duration of the phase;
   for a particular query, when the correlation level exceeds a threshold and the relative difference exceeds a threshold fraction of the maximum relative difference, classifying the particular query as causing a data skew in the distributed database; and
   displaying a message identifying the particular query as causing a data skew in the distributed database.

2. The method of claim 1, wherein the phase is a map phase.

3. The method of claim 2, wherein the value of the metric for a query is a count of how many records are read in the map phase of the query.

4. The method of claim 1, wherein the phase is a reduce phase.

5. The method of claim 4, wherein the value of the metric for a query is a count of how many bytes are read in the reduce phase of the query.

6. The method of claim 1, wherein determining the relative difference for a phase comprises determining a standard deviation of the corresponding phases of each of the plurality of queries and dividing the absolute difference between the duration of the phase and the average duration of the corresponding phases of each of the plurality of queries by the standard deviation.

7. The method of claim 1, wherein the selected queries were each selected based on having the value of the metric being within a defined range of values.

8. A system comprising a set of processing units and a non-transitory machine readable medium storing sets of instructions, which when executed by at least one of the processing units:
   for each of a selected plurality of queries to a distributed database:
      determine a duration of a phase of the query;
      determine a value of a metric correlated with the duration of the phase; and
      determine a relative difference between the duration of the phase and an average duration of the corresponding phases of each of the plurality of queries;
   based on the determined durations and the determined values, calculate a correlation level between the metric and the duration of the phase and a maximum relative difference between the average duration and the duration of the phase;
   for a particular query, when the correlation level exceeds a threshold and the relative difference exceeds a threshold fraction of the maximum relative difference, classify the particular query as causing a data skew in the distributed database; and
   display a message identifying the particular query as causing a data skew in the distributed database.

9. The system of claim 8, wherein the phase is a map phase.

10. The system of claim 9, wherein the value of the metric for a query is a count of how many records are read in the map phase of the query.

11. The system of claim 8, wherein the phase is a reduce phase.

12. The system of claim 11, wherein the value of the metric for a query is a count of how many bytes are read in the reduce phase of the query.

13. The system of claim 8, wherein determining the relative difference for a phase comprises determining a standard deviation of the corresponding phases of each of the plurality of queries and dividing the absolute difference between the duration of the phase and the average duration of the corresponding phases of each of the plurality of queries by the standard deviation.

14. The system of claim 8, wherein the selected queries were each selected based on having the value of the metric being within a defined range of values.

15. A non-transitory machine readable medium storing sets of instructions, which when executed by at least one processing unit:

for each of a selected plurality of queries to a distributed database:
  determine a duration of a phase of the query;
  determine a value of a metric correlated with the duration of the phase; and
  determine a relative difference between the duration of the phase and an average duration of the corresponding phases of each of the plurality of queries;
based on the determined durations and the determined values, calculate a correlation level between the metric and the duration of the phase and a maximum relative difference between the average duration and the duration of the phase;
for a particular query, when the correlation level exceeds a threshold and the relative difference exceeds a threshold fraction of the maximum relative difference, classify the particular query as causing a data skew in the distributed database; and
display a message identifying the particular query as causing a data skew in the distributed database.

16. The non-transitory machine readable medium of claim 15, wherein the phase is a map phase.

17. The non-transitory machine readable medium of claim 16, wherein the value of the metric for a query is a count of how many records are read in the map phase of the query.

18. The non-transitory machine readable medium of claim 15, wherein the phase is a reduce phase.

19. The non-transitory machine readable medium of claim 18, wherein the value of the metric for a query is a count of how many bytes are read in the reduce phase of the query.

20. The non-transitory machine readable medium of claim 15, wherein the selected queries were each selected based on having the value of the metric being within a defined range of values.

* * * * *